United States Patent Office 2,837,060
Patented June 3, 1958

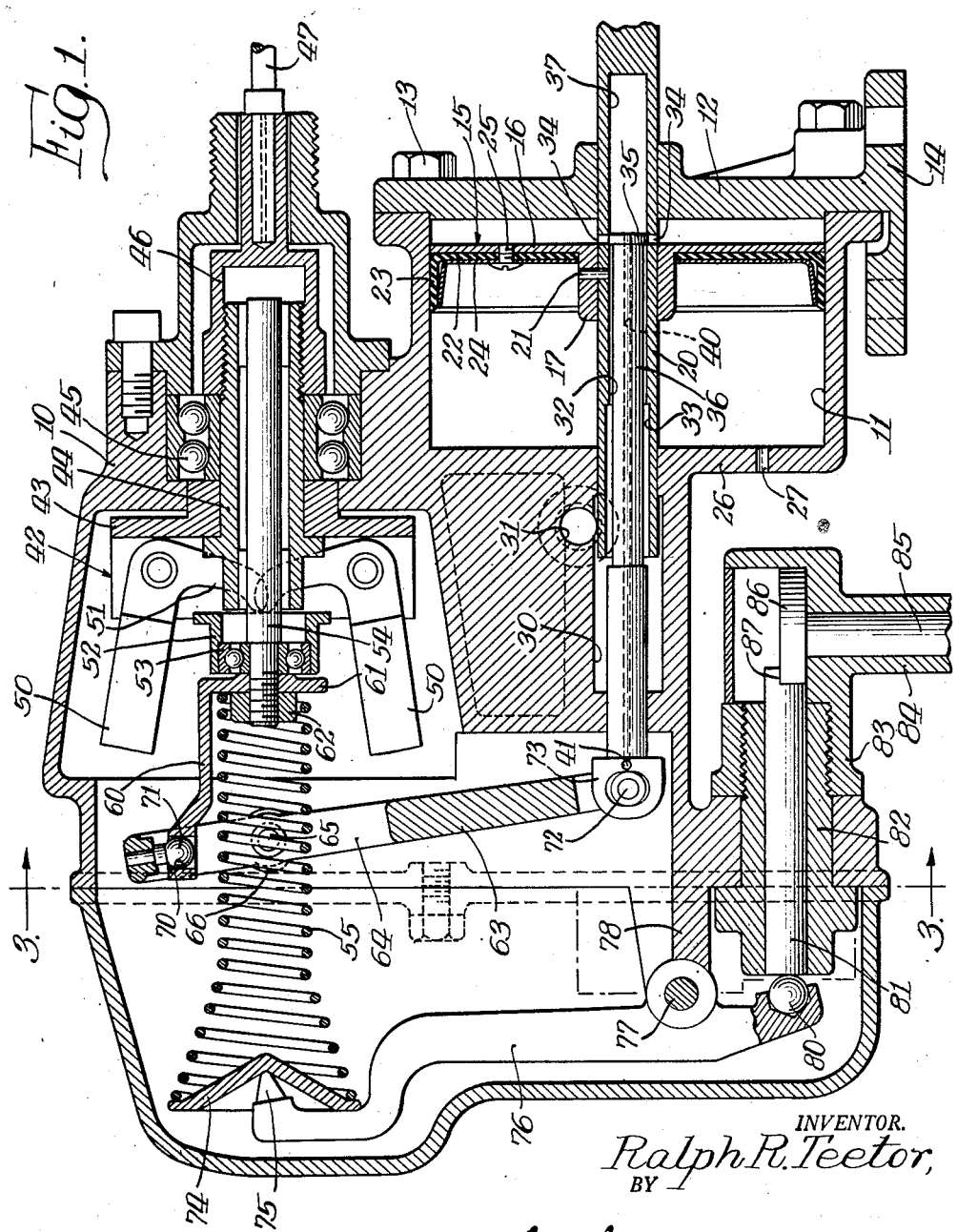

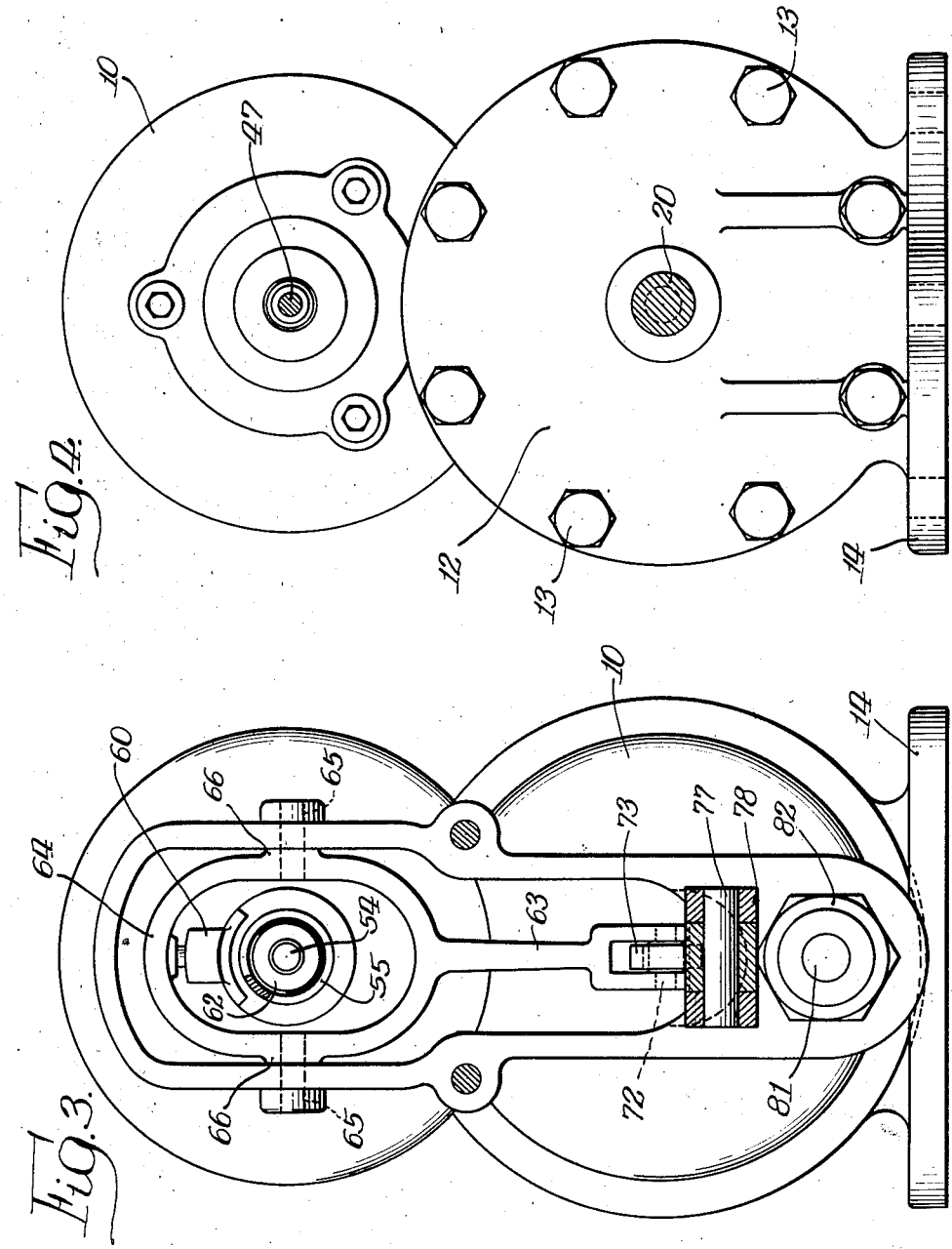

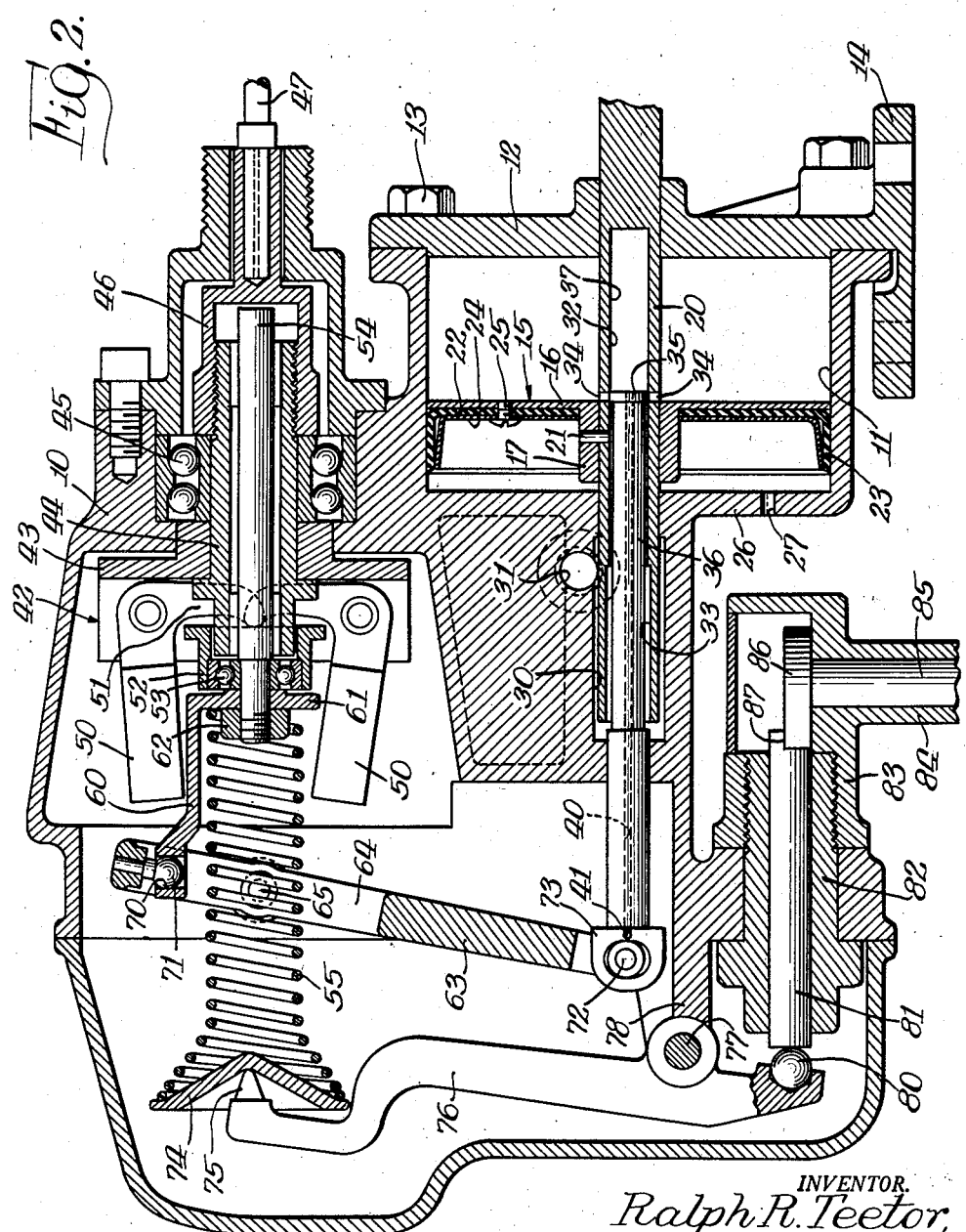

2,837,060

SPEED CONTROL DEVICE

Ralph R. Teetor, Hagerstown, Ind., assignor to Perfect Circle Corporation, Hagerstown, Ind., a corporation of Indiana Application December 15, 1953, Serial No. 398,365

5 Claims. (Cl. 121—42)

The invention relates generally to speed control devices and more particularly to a device for assisting an automobile driver in maintaining the speed of the vehicle at or below a predetermined speed.

In my Patent No. 2,519,859, issued August 22, 1950, a speed control device of the foregoing character is shown. A device of this character comprises generally a piston operating in a vacuum cylinder with the piston either connected to the accelerator pedal of the automobile or adapted to contact such pedal when the latter is depressed by the driver to increase the speed of the vehicle. Vacuum is admitted to the cylinder to offer resistance to depression of the accelerator pedal by means of a valve controlled by a governor responsive to the speed of the vehicle. The vacuum is provided from the intake manifold of the engine of the vehicle. Vacuum is admitted to the cylinder by means of such valve, when the accelerator pedal, and hence the piston, has been moved sufficiently to give the vehicle a predetermined speed, and the governor, operating at such speed, has moved the valve sufficiently to cooperate with the position of the piston in opening a port connected to the vacuum. When vacuum is applied to the piston in this manner, a resistance is offered to further depression of the accelerator pedal. However, in case it is desired to increase the speed of the vehicle beyond such predetermined speed, the accelerator pedal may be moved further against the resistance offered by the piston, and the acceleration of the engine tends to reduce the vacuum so that the resistance offered by the piston at such time is decreased.

The governor, which controls the above-mentioned valve, is of the type having weights which are swung outwardly under centrifugal force against the pressure of a spring. The resistance offered by the spring is adjustable so that the vehicle speed at which vacuum is admitted to the cylinder may be varied. The speed of the vehicle at which resistance is offered to further depression of the accelerator pedal may thus be adjusted within a wide range to suit the driver.

While both the device shown in the above-mentioned patent and the device disclosed herein are constructed and operate in the foregoing manner, the general object of the present invention is to provide a novel construction which provides a more sensitive response to speed variations of the vehicle at any speed for which the device is set.

More specifically, it is an object of the present invention to improve the action of the governor in controlling the movement of the valve for admitting vacuum to the cylinder.

Another object is to provide a speed control device of the foregoing general character, having a novel means for adjusting the speed of the vehicle at which resistance is offered to depression of the accelerator pedal.

A further object is to provide a novel speed control device of the foregoing character, which is compact in structure and may be readily mounted on a variety of makes of automobiles without requiring much in the way of special fittings.

Other objects and advantages will become apparent from the following description taken in connection with the accompanying drawings, in which:

Fig. 1 is a longitudinal sectional view of a device embodying the features of the invention and showing the position of certain of the parts thereof when the device is set for operation at a relatively low speed.

Fig. 2 is a view similar to Fig. 1 but showing the position of the parts when the device is set to operate at a higher speed;

Fig. 3 is a transverse sectional view taken on the line 3—3 of Fig. 1; and

Fig. 4 is a view of the right-hand end of the device as shown in Figs. 1 and 2.

The embodiment of the invention disclosed herein involves the same principles of operation as are utilized in the device shown in my prior patent. However, the present construction renders the action of the governor more sensitive and provides a much more compact structure that is more easily adapted for use with various makes of automobiles.

As shown in the drawings, the present construction comprises a body casting 10 having a cylinder 11 formed therein. The cylinder 11 is closed by a coverplate 12 secured to the casting 10 by the series of bolts 13 around the periphery of the coverplate. The coverplate 12 includes a bracket portion 14 by which the device may be mounted on the vehicle under the hood thereof.

Since the coverplate 12 is round, it may be rotatably adjusted on the body casting 10 so that the bracket 14 may have different angular positions relative to the body casting 10 to facilitate mounting in different makes of automotive vehicles.

Within the cylinder 11 is a piston indicated generally at 15 and comprising a disk member 16 having a hub portion 17 mounted on a piston rod 20. The piston 15 is rigidly secured to the piston rod 20 by means of a pin 21 extending radially through the hub portion 17 and into the piston rod. The piston 15 also includes a flexible washer 22 made of leather or the like and having a flange portion 23 engaging the wall of the cylinder 11 and forming a sliding seal therewith. The flexible washer 22 is secured in place by a sheet metal disk member 24 held in place by a screw 25 extending through the disk member and threaded into the piston 15.

The piston rod 20 extends through the inner wall 26 of the cylinder 11 and also through the coverplate 12. The end of the piston rod 20 beyond the coverplate is adapted to extend to the drive-operated throttle control member or accelerator pedal of the vehicle to be actuated thereby or may be moved through suitable linkage extending from the accelerator pedal so that the piston rod will be moved to the left, as shown in Figs. 1 and 2, when the accelerator pedal is depressed to increase the speed of the vehicle.

With the structure thus far described, depression of the accelerator pedal will move the piston rod 20 and consequently will move the piston 15 to the left within the cylinder 11. The space within the cylinder between the piston 15 and the inner end wall 26 is vented to the atmosphere as at 27 so that no resistance to the movement of the piston will be incurred by pressure within the cylinder on that side of the piston.

The space within the cylinder 11 at the other side of the piston, that is, between the piston and the coverplate 12, is adapted to be subjected to vacuum derived from the intake manifold of the engine when the vehicle reaches a predetermined speed of travel in accordance with a setting made by the operator of the vehicle. To this end, the piston rod 20 extends into a cavity 30 formed in the body casting 10 to the left of the inner end wall 26 of the cylinder, the cavity 30 being somewhat larger in diameter than the piston rod 20. The cavity 30 communicates with a threaded hole 31 in the body casting, which is adapted to be connected to the intake manifold of the vehicle by suitable tubing (not shown). The piston rod 20 is tubular in form for a major portion of its length to provide an interior bore 32 extending from its left-hand end to a point beyond and to the right of the piston 15. Preferably the bore 32 is enlarged, as at 33, at its left end to facilitate the admission of the vacuum from the cavity 30.

Extending radially from the bore 32 in the piston rod is one or more radial holes 34 located immediately to the right of the piston 15. Thus, when the radial holes 34 are open, vacuum is admitted to the portion of the cylinder between the piston 15 and the coverplate 12 to resist the movement of the piston by the accelerator pedal in a direction to increase the speed of the vehicle.

Opening of the radial holes 34 is controlled by two factors, namely, the position of the piston rod 20 and the position of a valve member 35 mounted within the bore 32 of the piston rod. The valve member 35 comprises a flange on a rod 36 mounted within the bore 32 of the piston rod and extending beyond the left end of the piston rod. The valve member 35 fits snugly within the bore 32 of the piston rod so that the radial holes 34 may be closed thereby, while the rod 36 is of smaller diameter than the diameter of the bore 32 so that vacuum may pass between the rod 36 and the interior of the bore.

When the valve member 35 is aligned with the radial holes 34 in the piston rod, the space between the piston 15 and the coverplate 12 is sealed off. However, when the valve member 35 is moved slightly to the right of such position, the space between the piston and the coverplate is subjected to vacuum since the radial holes 34 are then in communication with the space between the rod 36 and the bore 32 of the piston rod, which space, in turn, opens into the cavity 30 and thus will be subjected to the vacuum from the intake manifold of the vehicle. The application of such vacuum to the piston 15 thereby offers a resistance to further movement of the piston to the left and since such movement is effected by the depression of the accelerator pedal, the resistance will be felt by the operator of the vehicle. When the valve member 35 is to the left of the radial holes 34, the space within the cylinder between the piston and the coverplate communicates with the right-hand portion, indicated at 37, of the bore 32. This portion 37 is vented to the atmosphere by an axial passage 40 drilled throughout the length of the rod 36 and venting through an aperture 41 at the left-hand end of the rod 36. Thus, so long as the valve member 35 is to the left of the radial holes 34, the piston 15 is freely movable within the cylinder 11 since the spaces on both sides of the piston are then vented to atmosphere.

The valve member 35 is adapted to be moved within the piston rod 20 by a governor responsive to the speed of the vehicle, and the structure is so arranged that the valve member 35 will move to the right of the radial holes 34 to apply vacuum to the piston at any desired vehicle speed. Thus, for any speed at which the device is set, the operator of the vehicle will feel a resistance to depression of the accelerator pedal when the vehicle reaches such speed.

In the construction shown in my patent, the governor was aligned with the rod carrying the valve member for controlling the admission of vacuum to the cylinder and was directly connected to such rod so that the movement effected by the governor had to be sufficient to move the valve member within the piston rod through a distance substantially equal to the length of the vacuum cylinder for the different speed settings of the device. The governor shown in that patent was of the centrifugal weight type and the great range of movement that was necessary for movement of the valve member prevented the governor from being sufficient sensitive, particularly at its extreme positions of movement.

In the present construction, the governor is so positioned and connected to the rod 36 for moving the valve member 35, that the governor weights are restricted to movement only through a range where they are sufficiently sensitive to changes in vehicle speed. To this end, I provide a governor, indicated generally at 42, which is mounted at one side of the cylinder 11 on an axis parallel to the axis of the cylinder and has a motion-multiplying connection with the rod 36 so that the movement effected by the governor, while only through a relatively small range, can effect the desired range of movement for the valve member 35.

The governor 42 is illustrated as comprising a rotating head 43 secured to a tubular shaft 44 journalled in bearings 45 mounted in the body casting 10. The shaft 44 is adapted to be driven in accordance with the speed of the vehicle and is therefore provided with a coupling 46 adapted to receive a flexible drive cable 47 preferably connected to the drive cable of the speedometer for the vehicle so that it is responsive to the vehicle speed.

The rotating head 43 of the governor pivotally supports a pair of centrifugal weights 50, each having an inwardly extending arm 51 bearing against a collar 52 rotatable with the shaft 44 and slidable longitudinally thereof. The collar 52 is supported on a bearing 53 mounted on a shaft 54 extending into the shaft 44 and supported thereby. Movement of the collar 52 to the left by an increase in vehicle speed acting through the weights 50 is opposed by a spring 55. The spring 55 is preferably of trumpet shape to provide a varying spring rate as it is compressed to properly compensate for the action of the governor weights 50.

As heretofore mentioned, the governor is connected to the rod 36 carrying the valve member 35 by a motion-multiplying means which permits the governor weights 50 to move through a relatively small range for the variations in speed of the vehicle while the valve member 35 may be moved anywhere within the range of the length of the cylinder 11. The motion-multiplying connection between the governor and the rod 36 preferably comprises an arm 60 extending alongside the spring 55 and having a collar portion 61 mounted on the shaft 54 adjacent the bearing 53 and held in place by a nut 62 threaded on the end of the shaft 54. The collar portion 61 provides a seat for the spring 55. The outer end of the arm 60 has a universal connection with a lever 63. In order to provide a compact structure, the lever 63, which of course must extend from the arm 60 to the rod 36, has a yoke or loop portion 64 extending about the spring 55 so that the spring may be positioned within the loop or yoke portion and the latter does not interfere with the movement of the lever. The lever 63 is pivotally supported by pivot pins 65 extending through bosses 66 formed on either side of the yoke portion 64, the pivot pins 65 being supported in the adjacent portions of the body casting.

The universal connection between the arm 60 and the lever 63 preferably comprises a socket 70 formed in the end of the arm 60, to receive a ball member 71 extending from the adjacent portion of the yoke 64. By such a universal connection, no binding between the arm 60 and the lever 63 will occur. The other end of the lever 63 is pivotally connected to the rod 36 by means of a pivot pin 72 extending through a bifurcated end portion on the lever 63 and a boss 73 provided on the end of the rod 36. It will be noted that the position of the pivots 65 for the lever 63 is such that for a given movement of the collar 52 of the governor, the piston rod 36 will have a much greater range of movement.

The present invention also includes as one of its features structure for adjusting the vehicle speed at which vacuum will be applied to the piston, and hence the vehicle speed at which resistance will be offered to depression of the accelerator pedal. Such effect is obtained by varying the pressure of the spring 55 against the collar 52 so that varying speeds will be required to swing the weights 50 outwardly against the pressure of the spring. For this purpose, the flaring end of the spring 55 is seated against a cap 74 of conical form and extending inwardly of the spring. Bearing against the center of the cap 74 is a pointed end 75 formed on a lever 76. The latter is pivoted intermediate its ends by a pivot pin 77 mounted in a bifurcated boss 78 extending from the body casting 10. At the other end of the lever 76, there is formed a socket to receive a ball 80 bearing against one end of a pin 81 slidably mounted in a bushing 82. The bushing 82 is received in an aperture provided in an extension on the body casting 10 and is clamped therein at any position of rotative adjustment by a nut portion 83 formed on a shaft support 84.

The shaft support 84 has journalled therein a rotatable shaft 85 adapted to be connected by a flexible shaft to a suitable dial and lever means mounted conveniently to the operator and preferably on the dash of the automotive vehicle. The shaft 85 extends at right angles to the pin 81 and carries at its end an eccentric cam 86 fitting within a notch 87 formed in the end of the pin 81. Thus, by rotation of the shaft 85 from the dial means on the dash of the vehicle, the eccentric cam 86 will move the pin 81 longitudinally to swing the lever 76 and thus adjust the position of the cap 74 on which the spring 55 is seated. In this manner, the pressure of the spring 55 may be adjusted and as a consequence a higher speed of rotation of the centrifugal weights 50 will be required to shift the collar 52 of the governor. Such increased pressure of the spring 55 tends to shift the collar 52 to the right, as shown in Figs. 1 and 2, and through the lever 63, the valve member 35 will be moved to the left within the piston rod 20. Thus, the accelerator pedal will have to be depressed to a greater extent to move the piston rod 20 to the left to the point where the radial holes 34 are moved to the left of the valve member 35 to apply vacuum to the piston.

In operation, assume that the engine of the vehicle has been started and that vacuum is therefore available in the intake manifold, but the vehicle transmission is in neutral so that it is stopped. The governor is not then being driven so that the spring 55 can force the collar 52 to the right and thus move the weights 50 to their innermost position. In such a condition, the valve member 35 will be in the left-hand portion of the bore 32 in the piston rod 20, and the space between the piston and the coverplate 12 will be connected to atmosphere through the radial holes 34, the portion 37 of the bore within the piston rod, and the passage 40 in the rod 36. If the piston 15 is at the right end of the cylinder at such time, depression of the accelerator pedal will shift the piston to the left within the cylinder to the extent of movement of the accelerator pedal.

If the transmission of the vehicle is then thrown in gear, the forward speed of the vehicle will tend to cause the centrifugal weights 50 of the governor to swing outwardly and thus shift the collar 52 to the left. Such movement swings the lever 63 and moves the valve member 35 to the right within the bore 32. If, by proper setting of the pressure exerted by the spring 55, resistance to depression of the accelerator pedal is to occur at a relatively low speed, the weights 50 will swing outwardly far enough at such speed to cause a shifting of the valve member 35 to the right of the radial holes 34 to apply vacuum to the piston. Such a condition is illustrated in Fig. 1, where the valve member 35 is just on the point of opening the radial holes 34 to connect the vacuum with the cylinder. The point at which this occurs of course is due not only to the position of the valve member 35 but also to the position of the piston rod resulting from depression of the accelerator pedal. If the vehicle is maintained at the set speed, the valve member 35 will remain at the position where it is just beginning to open the radial holes 34 so that the operator of the vehicle may hold the accelerator pedal at the point where the vehicle has the set speed and the resistance due to vacuum is thereby provided in the cylinder.

If the operator, while travelling at such speed, desires to increase the speed momentarily above the set speed, as he may wish to do to pass another vehicle, he may depress the accelerator pedal further against the resistance offered by the vacuum and cause further acceleration of the engine of the vehicle. Such acceleration causes a decrease in the vacuum in the intake manifold and thus lessens the resistance offered to the accelerator pedal. When the driver wishes to resume the set speed, he merely lets up on the accelerator pedal until the normal resistance is offered to depression thereof.

When the device is set to operate at a higher speed, as shown in Fig. 2, the shaft 85 is rotated to cause the eccentric cam 86 to swing the lever 76 clockwise about its pivot 77 and thus cause the spring 55 to exert a greater pressure against the collar 52 of the governor. Such increased pressure by the spring 55 and the consequent movement of the collar 52 to the right will swing the lever 63 clockwise about its pivot and move the valve member 35 to the left. The vehicle operator can then depress the accelerator pedal to a greater extent since the radial holes 34 will then be to the right of the valve member 35 and no resistance will be offered to such movement of the accelerator pedal.

When the vehicle reaches the newly set speed, the action of the centrifugal weights 50 will be such as to move the valve member 35 to the right to open the radial holes 34 to vacuum, thus offering resistance to further depression of the accelerator pedal. If the vehicle exceeds such speed, the resistance offered by the vacuum will remain although it may decrease to some extent if the engine is accelerating at that point. If the vehicle speed falls below such set speed, the valve member 35 will first close the radial holes 34 and then connect them with the atmosphere to eliminate the vacuum effect on the piston and thereby remove resistance to depression of the accelerator pedal. In that case, the accelerator pedal can of course be depressed further with ease until such speed has been attained that the valve member 35 opens the radial holes 34 to vacuum when the resistance to further depression of the accelerator pedal will be reestablished.

From the foregoing description, it will be evident that I have provided a novel construction in which the governor provides a more sensitive response to speed variations of the vehicle at any speed for which the device is set. While the valve member 35 requires a substantial length of movement for operation both at low and high speeds, the range of movement of the governor remains comparatively small since the lever 63 provides the necessary multiplication of the movement of the governor to effect the desired greater movement of the valve member 35. There is very little pressure opposing movement of the valve 35 and very little friction involved therein so that the forces required on the part of the governor to swing the lever 63 are comparatively light. Thus, while the range of movement necessary in the governor is small, this arrangement does not impose excessive forces on the governor. Since the governor movement is relatively small, it is thus highly sensitive to speed changes of the vehicle and the inaccuracies involved where the governor has a wide range of movement do not occur. The present invention also provides a novel means for adjusting the speed of the vehicle at which resistance is offered to the depression of the accelerator pedal and the structure of the entire device is such that it is compact and thus may be readily mounted under the hood of an automotive

I claim:

1. A vacuum operated speed control device for an automotive vehicle comprising a cylinder and a piston tending to move in one direction when vacuum is applied to said cylinder, a pair of shiftable valve members for controlling the application of vacuum to said cylinder, one member being movable with the piston, a governor having a drive shaft mounted on an axis parallel to the cylinder axis, said governor including a collar shiftably mounted at one end of said shaft and movable by the governor, a spring aligned with said shaft and opposing movement of said collar by said governor, and a lever connected at one end to the other of said pair of members and at its other end to said collar and having a yoke portion extending about said spring, said yoke portion being pivotally supported at opposite sides of said spring.

2. A vacuum operated speed control device for an automotive vehicle comprising a cylinder and a piston tending to move in one direction when vacuum is applied to said cylinder, a pair of shiftable valve members for controlling the application of vacuum to said cylinder, one member being movable with the piston, a governor having a drive shaft mounted on an axis parallel to the cylinder axis, said governor including a collar shiftably mounted at one end of said shaft and movable by the governor, a spring aligned with said shaft and opposing movement of said collar by said governor, and a lever connected at one end to the other of said pair of members and having a yoke portion at its other end extending about said spring and pivotally supported at opposite sides of said spring, the outer end of said yoke portion having a universal connection with said collar.

3. A vacuum operated speed control device for an automotive vehicle comprising a cylinder and a piston tending to move in one direction when vacuum is applied to said cylinder, a pair of shiftable valve members for controlling the application of vacuum to said cylinder, one member being movable with the piston, a governor having a drive shaft mounted on an axis parallel to the cylinder axis, said governor including a collar shiftably mounted at one end of said shaft and movable by the governor, a spring aligned with said shaft and opposing movement of said collar by said governor, and a lever connected at one end to the other of said pair of members and having a yoke portion at its other end extending about said spring and pivotally supported at opposite sides of said yoke portion having a ball member extending into the yoke, and an arm having a universal connection with said ball member and movable with said collar.

4. A vacuum operated speed control device for an automotive vehicle comprising a cylinder and a piston tending to move in one direction when vacuum is applied to said cylinder, a pair of shiftable valve members for controlling the application of vacuum to said cylinder, one member being movable with the piston, a governor having a drive shaft mounted on an axis parallel to the cylinder axis, said governor including a collar shiftably mounted at one end of said shaft and movable by the governor, a spring bearing at one end against said collar to oppose movement thereof by said governor, a lever connecting said collar and the other of said pair of members and having a pivotally mounted yoke portion extending about said spring, a bearing plate for the opposite end of said spring, and means for adjusting said bearing plate to vary the pressure of the spring.

5. A vacuum operated speed control device for an automotive vehicle comprising a cylinder and a piston tending to move in one direction when vacuum is applied to said cylinder, a pair of shiftable valve members for controlling the application of vacuum to said cylinder, one member being movable with the piston, a governor having a drive shaft mounted on an axis parallel to the cylinder axis, said governor including a collar shiftably mounted at one end of said shaft and movable by the governor, a spring bearing at one end against said collar to oppose movement thereof by said governor, a lever connecting said collar and the other of said pair of members and having a pivotally mounted yoke portion extending about said spring, a bearing plate for the opposite end of said spring, a second lever pivoted intermediate its ends and bearing at one end against said plate, and manually operable means connected to the other end of said second lever for varying the pressure of the spring.

References Cited in the file of this patent

UNITED STATES PATENTS

| | | |
|---|---|---|
| 1,231,261 | Kasley | June 26, 1917 |
| 1,304,286 | Emden | May 20, 1919 |
| 1,833,908 | Maybach | Dec. 1, 1931 |
| 2,111,284 | Girl et al. | Mar. 15, 1938 |
| 2,292,805 | Tippen | Aug. 11, 1942 |
| 2,519,859 | Teetor | Aug. 22, 1950 |
| 2,529,437 | Weinberger | Nov. 7, 1950 |
| 2,560,914 | Almeras | Aug. 17, 1951 |